United States Patent

Nagao et al.

[11] Patent Number: 5,285,525
[45] Date of Patent: Feb. 8, 1994

[54] INDUSTRIAL ROBOT CONTROL METHOD AND APPARATUS

[75] Inventors: Yoichi Nagao; Hideaki Ohta, both of Kakogawa; Kazuhiko Onoue, Nishinomiya; Hisanori Nakamura, Toyota, all of Japan

[73] Assignees: Kawasaki Jukogyo Kabushiki Kaisha, Kobe; Toyota Jidosha Kabushiki Kaisha, Toyota, both of Japan

[21] Appl. No.: 654,542

[22] Filed: Feb. 13, 1991

[30] Foreign Application Priority Data

Feb. 14, 1990 [JP] Japan ................................. 2-34889

[51] Int. Cl.$^5$ ............................................. G05B 19/18
[52] U.S. Cl. .................................... 395/87; 395/86; 395/97; 395/98; 901/9
[58] Field of Search .................. 395/87, 97, 86, 98; 901/9

[56] References Cited

U.S. PATENT DOCUMENTS

| | | | |
|---|---|---|---|
| 4,620,436 | 11/1986 | Hirabayashi et al. | 73/1 |
| 4,677,568 | 6/1987 | Arbter | 901/3 |
| 4,873,476 | 10/1989 | Kurakake et al. | 901/9 |
| 4,893,254 | 1/1990 | Chan et al. | 901/9 |
| 5,020,001 | 5/1991 | Yamamoto et al. | 395/87 |

Primary Examiner—Allen R. MacDonald
Attorney, Agent, or Firm—Oliff & Berridge

[57] ABSTRACT

A method and apparatus for controlling an industrial robot. Values of $\theta_i$ for positions/postures of robot axes are determined, when a work mounted to the end of a robot hand is located adjacent to the end of a fixed tool, the tool being separated from the robot. Positions/postures $\overline{X}_i$ are determined in a reverse representation of the robot base for a coordinate system of the end of the hand, for the values of $\theta_i$, by a forward transformation operation by which positions/postures of the end of the hand with respect to the base are determined using the values $\theta_i$. Positions/postures $T_i$ in a matrix representation of the end of the tool in the coordinate system of the end of the hand are also determined, for the positions/postures of the axes, based on $\overline{X}_i$ and predetermined positions/postures P of the end of the tool using the coordinate system of the base. Intermediate positions/postures $T_j$ each between two $T_i$ positions/postures are determined, using an interpolation function. Positions/postures $\overline{X}_j$ are determined in a reverse matrix representation of the end of the base using the coordinate system of the end of the hand based on P and $T_j$. Positional values $\theta_j$ corresponding to positions/postures of the axes and to $X_j$ are determined, using a reverse transformation operation. The robot is then driven using $\theta_j$.

2 Claims, 7 Drawing Sheets

INDUSTRIAL ROBOT CONTROL METHOD AND APPARATUS

BACKGROUND OF THE INVENTION

The present invention relates to a control method and control apparatus for performing work such as welding, sealing or other work which can be performed by industrial robots.

When work using conventional industrial robots has been performed, the work object (work) is fixed, and then an arc welding torch attached to the hand of the robot is moved along the line of work. However, the posture of the welding torch when this is done changes with the progress of the work so as to be undesirable with respect to the work quality. And since the tool is fitted to the hand of the robot, the cables connecting the tool have to be suitably processed so as not to become an obstruction. Also, with this technology, each of a plural number of works are conveyed in sequence and the conveyed work has to be stopped accurately at a predetermined position so that there is also the problem that the apparatus for doing this has a complex structure.

SUMMARY OF THE INVENTION

An object of the present invention is to provide a control method and control apparatus for an improved industrial robot that can improve the quality of work such as sealing and welding and the like, simplify the processing for flexible tubes for conveying fluid and cables that are connected to the tool, and simplify the configuration for the conveying and the positioning of the work.

According to the first aspect of the invention, there is provided an industrial robot control method, comprising the steps of:

determining the values $\Theta i$ of each axis when the predetermined position of a work mounted to the end of a hand of an industrial robot having a plural number of axes comes to the position of the distal end of a tool provided to a fixed position, determining the position/posture of the end of a hand of a robot with respect to the robot base as the position/posture $\overline{X}i$ of a robot base with respect to the coordinate system of the end of the hand of the robot, for each of the values $\Theta i$ for each axis using the forward transformation operation determined from the values for each axis of the robot, determining the position/posture $Ti$ of the distal end of the tool with respect to the coordinate system of the end of the hand of the robot for each of the positions/postures already determined, on the basis of the position/posture P of the distal end of the tool with respect to the coordinate system of the robot base, and the position/posture $\overline{X}i$ of the robot base with respect to the coordinate system of the end of the hand of the robot, determining positions/postures $Tj$ intermediate between each position/posture $Ti$ of the distal end of the tool, using an interpolation function h, determining the position/posture $\overline{X}j$ of the robot base with respect to the coordinate system of the end of the hand of the robot on the basis of the position/posture P of the distal end of the tool with respect to the coordinate system of a robot base and intermediate positions/postures $Tj$, determining command values $\Theta j$ for each of the axes of the robot representing the position/posture $\overline{X}j$ of the robot base with respect to the coordinate system of the end of the hand of the robot using the reverse transformation operation $f^{-1}$ of the forward transformation operation f, and driving the robot using the values $\Theta$ for each axis of the robot as command values.

According to the second aspect of the invention, there is provided an industrial robot control apparatus, for controlling an industrial robot having a plurality of axes and a robot base provided to a fixed position, a hand for holding a work at the end thereof and a tool mounted to a fixed position, comprising:

detection means for detecting values for each axis, drive means for driving each axis, and a control means for controlling said drive means in accordance with the output of said detection means, said control means storing values $\Theta i$ of each axis when a predetermined position of the work mounted to the end of the hand of the industrial robot comes to the position of the distal end of the tool provided to a fixed position, using the forward transformation operation determined from the values for each axis of the robot, to determine the position/posture of the end of the hand of the robot with respect to the robot base as the position/posture $\overline{X}i$ of the robot base with respect to a coordinate system of the end of the hand of the robot, for each of the stored values $\Theta i$ for each axis, using the position/posture of the distal end of the tool with respect to the coordinate system of the robot base, and the position/posture $\overline{X}i$ of the robot base with respect to the coordinate system of an end of the hand of the robot as the basis for determining the position/posture $Ti$ of the distal end of a tool with respect to the coordinate system of the end of the hand of the robot for each of the positions/postures already determined, using an interpolation function h to determine positions/postures $Tj$ intermediate between each position/posture $Ti$ of the distal end of the tool, using the position/posture P of the distal end of the tool with respect to the coordinate system of the robot base and intermediate positions/postures $Tj$ as the basis to determine the position/posture $\overline{X}j$ of a robot base with respect to the coordinate system of the end of the hand of the robot, and using the reverse transformation operation $f^{-1}$ of the forward transformation operation f to determine command values $\Theta j$ for each of the axes of a robot in order to express the position/posture $\overline{x}j$ of a robot base with respect to the coordinate system of the end of the hand of the robot, and using the values for each axis of the robot as command values $\Theta j$ to drive the robot.

According to the present invention, the tool of an arc welding torch or the like is fixed at a suitable relative position with respect to the industrial robot and in a status where the work is held in the hand of the robot, the work and the tool are held in position and posture relationships suitable for the work to be performed and the industrial robot is operated and the work performed. Accordingly, for example, if the arc welding torch is in a predetermined downward posture in vertical direction, it is possible to perform high-quality arc welding work while the work is being moved by the industrial robot. In addition, the tool is provided at a fixed position and so it is possible for the tubes for conveying fluids and the cable for the power supply to be attached at fixed positions to the tool and therefore simplify the processing for such. Furthermore, the work is held in the hand of the robot and is moved and so it is not necessary to have a configuration for the conveying of the work and its accurate positioning as was the case for the previously described conventional technology, thus simplifying the configuration.

DESCRIPTION OF THE PREFERRED EMBODIMENTS

Figure 1:
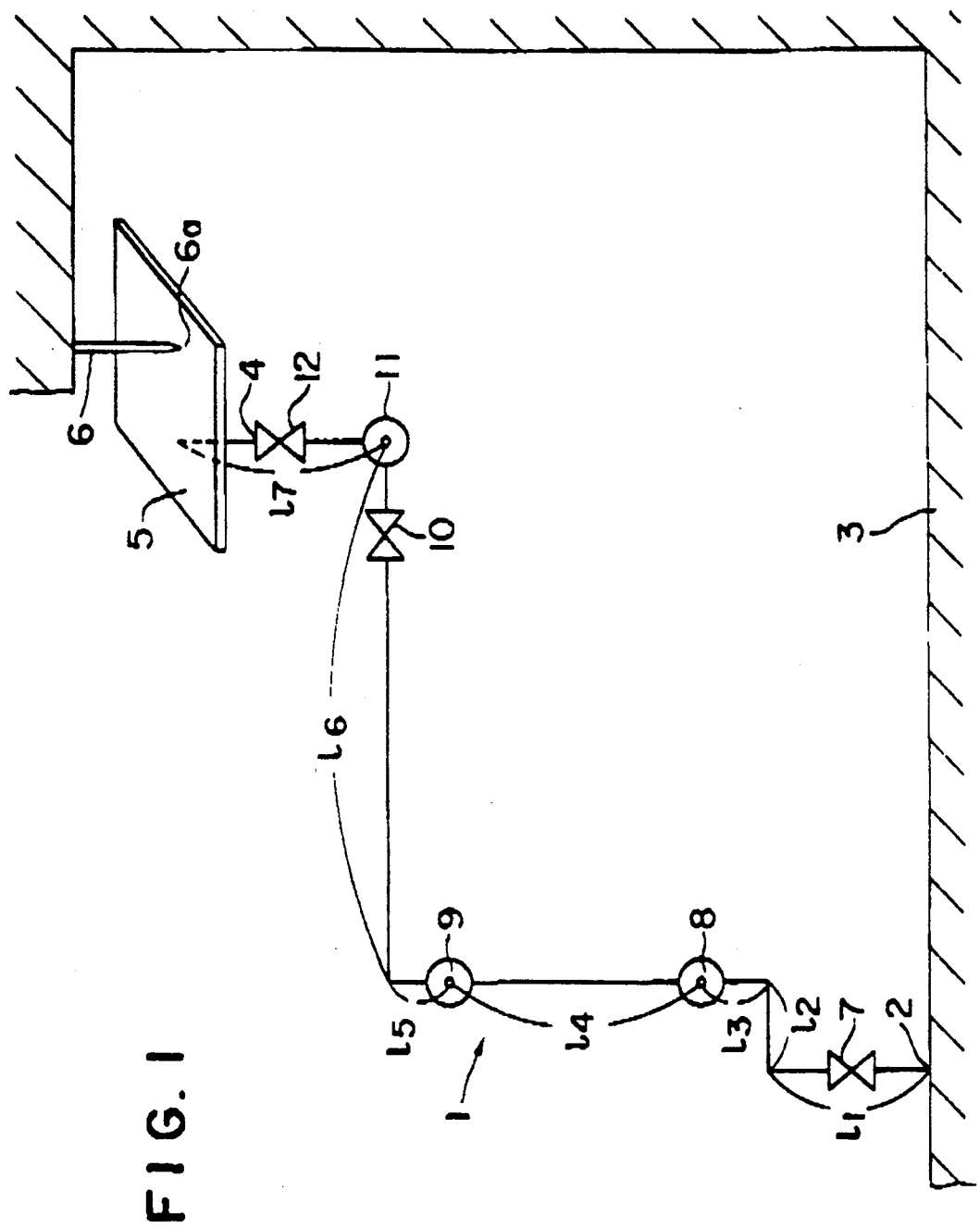
FIG. 1 is a diagram of the overall system of one embodiment according to the present invention.

FIG. 1 is a diagram of the overall system of one embodiment according to the present invention. A robot base 2 of an industrial robot 1 is provided at a fixed position 3 such as a floor of a factory and the hand 4 of the industrial robot 1 holds a work 5 which is work object with respect to which arc welding work or the like is to be performed. This work 5 is moved by the industrial robot 1 and arc welding work is performed by an arc welding torch 6 which is the tool which is attached at the fixed position. This arc welding torch 6 has a vertical axial line and is facing downwards so that high-quality welding is performed for the work by the distal end 6a of the torch 6. The industrial robot 1 has a total of six axes 7 through 12 that are provided successively to the base 2. Of these axes 7 through 12 axes 7, 10 and 12 are angularly movable around the axial line of the arm to which they are mounted and axes 8, 9 and 11 are angularly movable around the axial line which is vertical with respect to the arm to which they are mounted.

Figure 2:
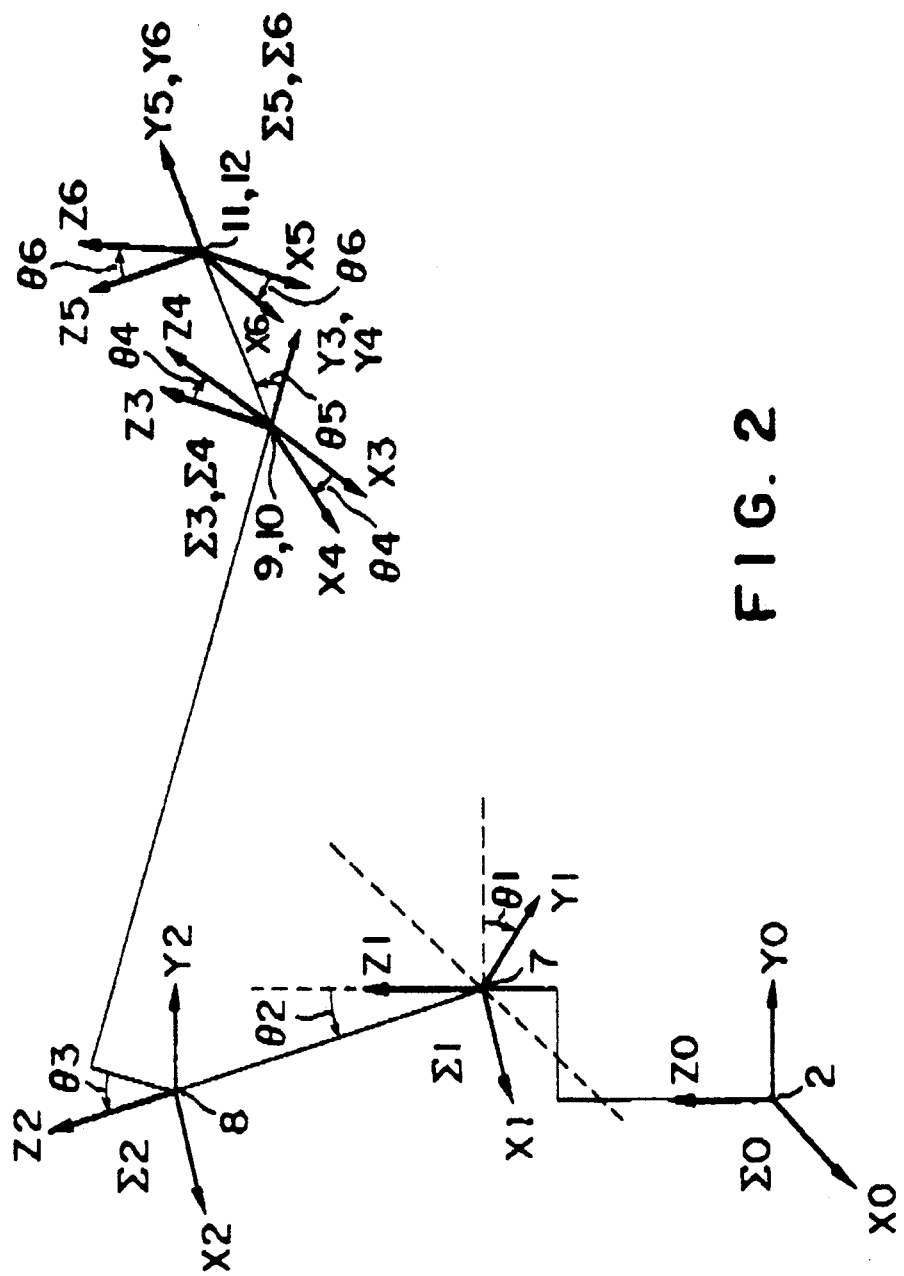
FIG. 2 is a diagram indicating the coordinate system of the embodiment shown in FIG. 1.

FIG. 2 shows the coordinate systems Σ0 through Σ6 for each of the axes 7 through 12 and the robot base 2, and the angles θ1 through θ6. The position of the hand 4 can be expressed as three-dimensional coordinates and an origin of the robot base 2 and the posture can be expressed as three angles by the Euler angle with the robot base 2 as the origin.

Figure 3:
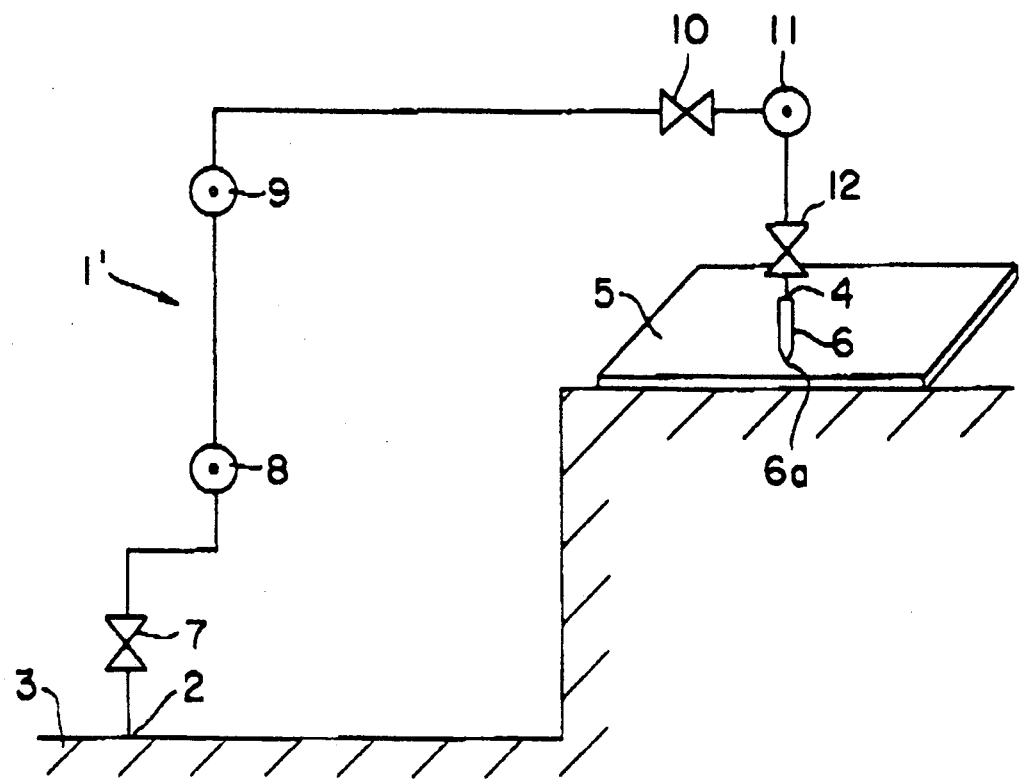
FIG. 3 is a system diagram showing the configuration which is a premise of the present invention.

FIG. 3 is a system diagram showing the configuration which is a comparative object of the present invention, and this industrial robot 1' has the same configuration as was previously described with respect to FIG. 1 and FIG. 2 except that in this FIG. 3, the work 5 is mounted to a fixed position and the hand 4 has an arc welding torch 6 mounted to it, with this arc welding torch 6 being moved by the industrial robot 1 to perform the welding.

Figure 4:
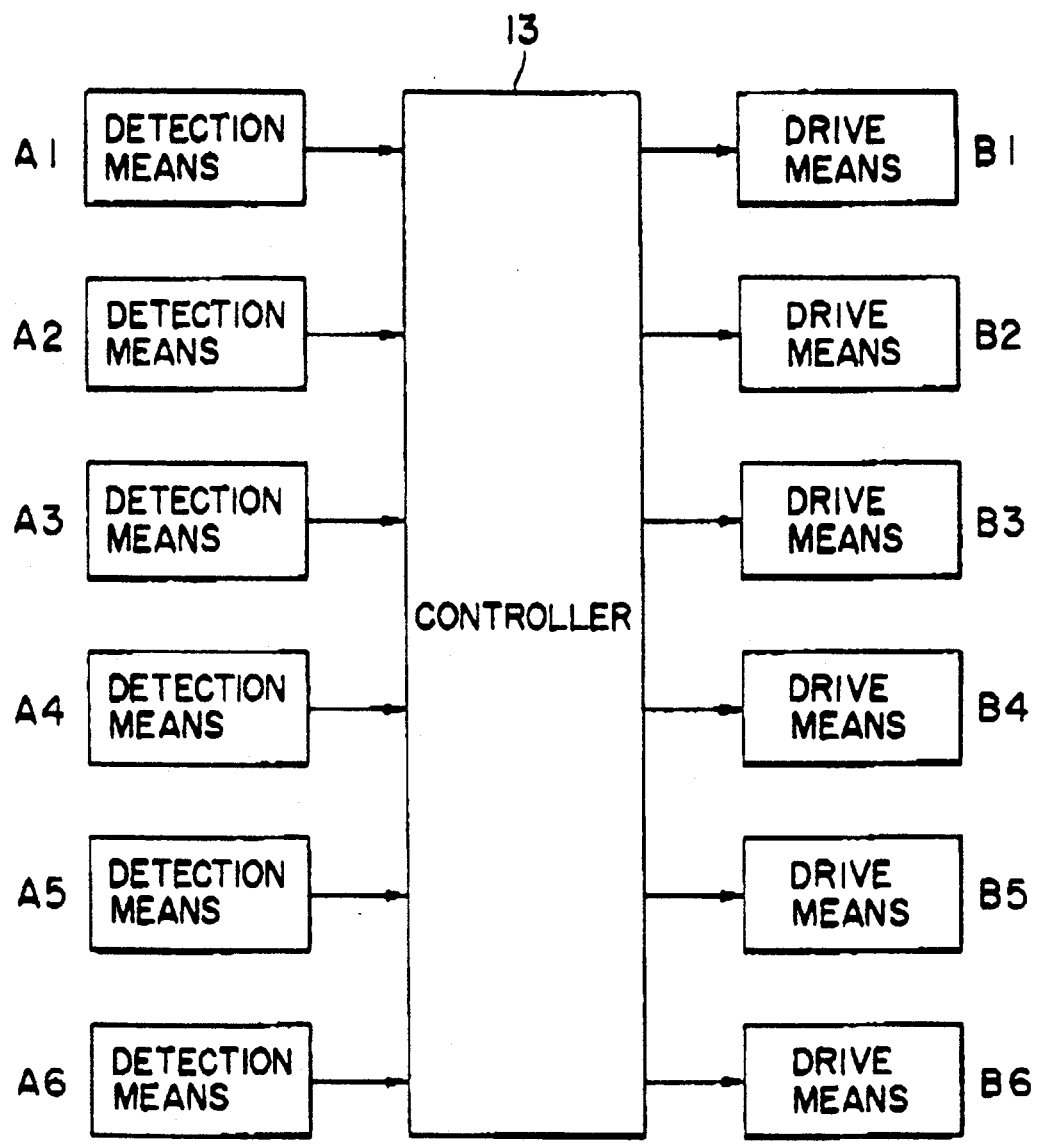
FIG. 4 is a block diagram indicating the electrical configuration of one embodiment of the present invention.

FIG. 4 is a block diagram indicating the electrical configuration of one embodiment of the present invention. The angles of each of the axes 7 through 12 are detected by detection means A1 through A6 such as encoders or the like and the signals that express those detected values are applied to a processing control circuit 13 that is realized by a microcomputer or the like, so that each of the axes 7 through 12 are driven by each drive means B1 through B6.

Figure 5:
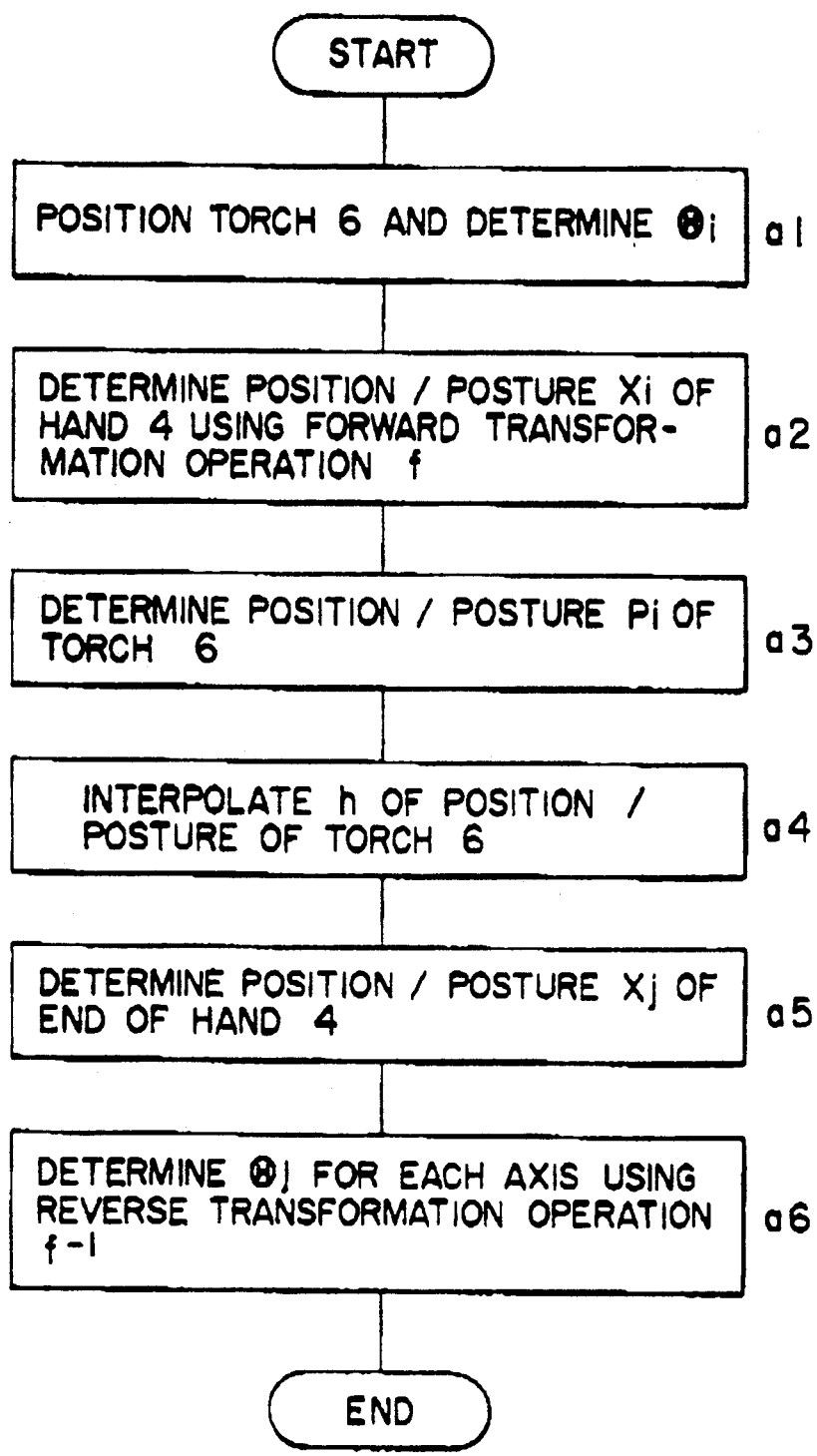
FIG. 5 is a flow chart for describing the operation of the configuration shown in FIG. 3.

As is shown in FIG. 3, the arc welding torch 6 is mounted to the hand 4 of the industrial robot 1' and FIG. 5 describes the operation of the control circuit 13 for the operation performed to weld the work 5 when it is in the status where the work 5 is provided to a fixed position. First, in step a1, the distal end 6a of the torch 6 of the arc welding torch 6 is positioned to a predetermined position on the work 5 and when this is done, the value θ1 through θ6 of each of the axes 7 through 12 of the robot (generally expressed by Θ, with i corresponding to each of the predetermined positions) is detected and determined by the detection means A1 through A6.

Then, in the following step a2, the forward transformation operation f is used to determine the position/posture Xi of the hand 4 of the industrial robot 1 with respect to the robot base 2.

$$Xi = f(\Theta i) \tag{1}$$

In step a3, the position/posture T of the distal end 6a of the torch 6 with respect to the coordinate system of the hand 4 of the industrial robot 1, and the position Pi of the distal end 6a of the torch 6 with respect to the robot base 2 is determined using the position/posture Xi of the hand 4 of the industrial robot 1.

$$Pi = Xi \cdot T \tag{2}$$

In step a4, the function h so as to interpolate the position/posture Pj between P1 and P2 which are two points of the positions Pi of the distal end 6a of the torch 6 and which were determined in the previous step a3, is then determined.

$$Pj = h(P1, P2) \tag{3}$$

This function h for interpolation can be any function that performs arc interpolation or linear interpolation.

The position/posture T of the distal end 6a of the torch 6 with respect to the coordinate system of the hand 4 of the industrial robot 1 previously described is defined as the tool transformation value. This tool transformation value T is always constant, and therefore its inverse matrix $T^{-1}$ is also constant. In step a5, the position/posture Pj of the distal end of the arc welding torch 6 and determined in step a4 is used as the basis for determining the position/posture Xj of the hand 4 of the industrial robot 1.

$$Xj = Pj \cdot T^{-1} \tag{4}$$

Finally, in step a6, the values Θj of each of the axes of the robot are determined in order to realize the position/posture Xj of the hand 4 of the industrial robot 1. This is the operation $f^{-1}$ which is known as the inverse transformation of the forward transformation operation f which was described earlier.

$$\Theta j = f^{-1}(Xj) \tag{5}$$

In the present invention, as has been described with respect to FIG. 1, the arc welding torch 6 is fixed in a position relative to the industrial robot 1 and drive means B1 through B6 of each of the axes 7 through 12 of the industrial robot 1 are driven so that the arc welding torch 6 moves along the work line of the work 5 held in the hand 4 of the industrial robot 1. Accordingly, there is a constant relationship between the distal end 6a of the torch 6 and the hand 4 of the industrial robot 1 in that there is a constant relationship between the distal and 6a of the torch 6 and the hand 4 of the industrial robot 1. Accordingly, in the configuration described with respect to FIG. 3 and FIG. 5, the control method can be thought of as having the robot base 2 as the reference but in the present invention, the hand 4 of the industrial robot 1 and the work can be thought of as being the reference so that it is possible to establish a similarity with the method of the present invention and the control method that was described with respect to FIG. 3 and FIG. 5. More specifically, the robot base 2 in the configuration shown in FIG. 3 and FIG. 5, can be thought of in the present invention as being the hand 4 of the industrial robot 1 and the hand 4 of the industrial robot 1' shown in FIG. 3 and FIG. 5 can be thought of as being the robot base 2, with the position/posture Pi of the distal end 6a of the torch 6 with respect to the coordinate system of the robot base 2 in FIG. 3 and FIG. 5 being able to be expressed as the position/posture of the distal end 6a of the torch 6 with respect to the coordinate system of the hand 4 of the industrial robot 1 of the present invention, or rather, as the tool transformation value Ti. In addition, the position/posture T of the distal end 6a of the torch 6 with respect to the coordinate system of the hand 4 of the industrial robot 1' in FIG. 3 and FIG. 5 can be seen as the position/posture P of the distal end 6a of the torch 6 with respect to the coordinate system of the robot base 2 in the present invention.

Figure 6:
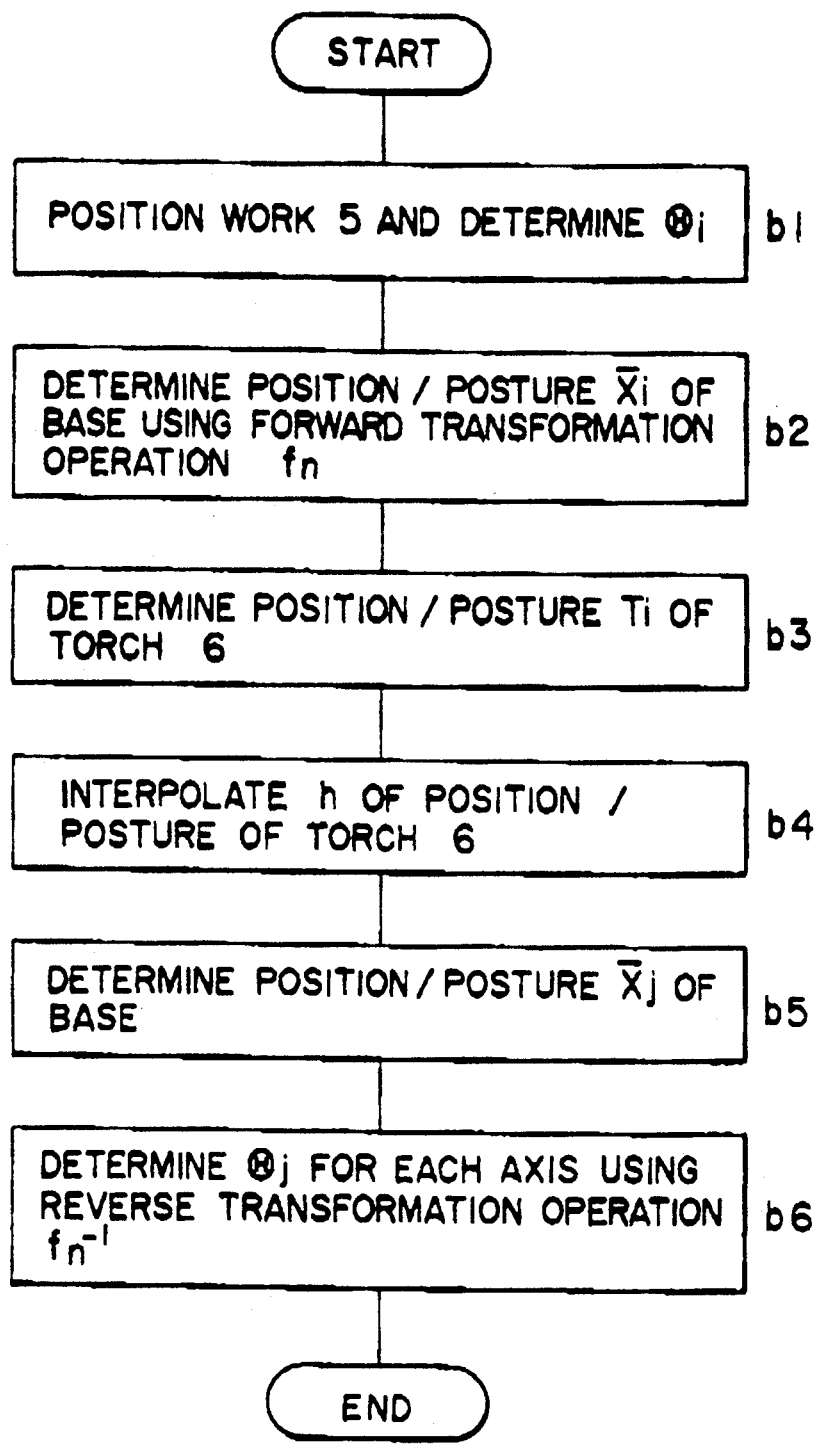
FIG. 6 is a flow chart for describing the principle of the present invention.

Accordingly, in the embodiment according to the present invention, the torch 6 replaces the work 5 in the processing control circuit 13 shown in FIG. 4 and performs the operations shown in FIG. 6. More specifically, in step b1, the predetermined position of the work 5 is determined so as to be a position that comes to the position of the distal end 6a of the torch 6 and when this occurs, the values Θ for each of the axis of the industrial robot 1 are detected and determined by the detection means A1 through A6. Following this, in step b2, a new forward transformation function fn in accordance with the present invention is used in order to convert into position/posture of the robot base 2 with respect to the coordinate system of the hand 4, and determined the position/posture $\overline{X}i$ of the robot base 2 with respect to the coordinate system of the hand 4 from the value Θ for each of the axes determined in the previous step b1.

$$\overline{X}i = fn(\Theta i) \quad (6)$$

In step b3, the relationship P for the position/posture of the distal end 6a of the torch 6 with respect to the coordinate system of the robot base 2 and the position/posture $\overline{X}i$ for of the robot base 2 and which was determined in the previous step b2 are both used as the basis for determining the position/posture Ti of the distal end 6a of the torch 6 with respect to the coordinate system of the hand 4 for each of the positions/postures that have been previously determined.

$$Ti = \overline{X}i \cdot P \quad (7)$$

In step b4, two of the positions/postures of the distal end 6a of the arc welding torch 6 determined in step b3, such as the intermediate positions Tj between T1 and T2 for example, are determined by the arc or linear interpolation function h.

$$Tj = h(T1, T2) \quad (8)$$

In step b5, the relationship P of the position/posture of the distal end 6a of the arc welding torch 6 with respect to the coordinate system of the robot base 2 is always constant and so the reverse matrix $p^{-1}$ is also constant. Here, in this step B5, this relationship P and the position/posture Tj determined in step b5 are used as the basis for determining the position/posture $\overline{X}j$ of the robot base with respect to the coordinate system of the hand 4 of the robot.

$$\overline{X}j = Tj \cdot p^{-1} \quad (9)$$

Finally, in step b6, the reverse transformation function $fn^{-1}$ that converts the relationship of the position/posture of the robot base 2 with respect to the coordinate system of the hand 4 of the robot into the values Θj for each of the axes in order to express the relationship $\overline{X}j$ for the position/posture of the robot base 2 with respect to the coordinate system of the hand 4 of the robot.

$$\Theta j = fn^{-1}(\overline{X}j) \quad (10)$$

A control means 13 drives the drive means B1 through B6 by the values Θj for each of the axes, as determined by equation 10.

The following considers the newly introduced forward transformation operation fn and the reverse transformation operation $fn^{-1}$.

First, the forward transformation operation fn is a function to convert the values Θi for each of the axes of the robot into the relationship Xi of the robot base with respect to the robot hand, and on the other hand, the conventional forward transformation operation f is a function to convert the values Θi for each of the axes of the robot into the relationship Xi of the distal end 4a of the robot hand 4 with respect to the robot base 2.

$$Xi = f(\Theta i) \quad (11)$$

$$Xi^{-1} = fn(\Theta i) \quad (12)$$

Accordingly, $$fn(\Theta i) = \{f(\Theta i)\}^{-1} \quad (13)$$

Then, the reverse transformation function $fn^{-1}$ is a function to convert the position/posture $Xi^{-1}$ of the robot base 2 with respect to the coordinate system of the distal end 4a of the robot hand 4 into the values Θi for each of the axes of the robot, and on the other hand, the conventional reverse transformation operation $f^{-1}$ is a function to convert the relationship Xi for the distal end 4a of the robot hand 4 with respect to the coordinate system of the robot base 2 into the values Θi for each of the axes of the robot.

$$\Theta i = f^{-1}(Xi) \quad (14)$$

$$\Theta i = fn^{-1}(Xi^{-1}) \quad (15)$$

Accordingly, $$fn^{-1}(Xi) = f^{-1}(Xi^{-1}) \quad (16)$$

Figure 7:
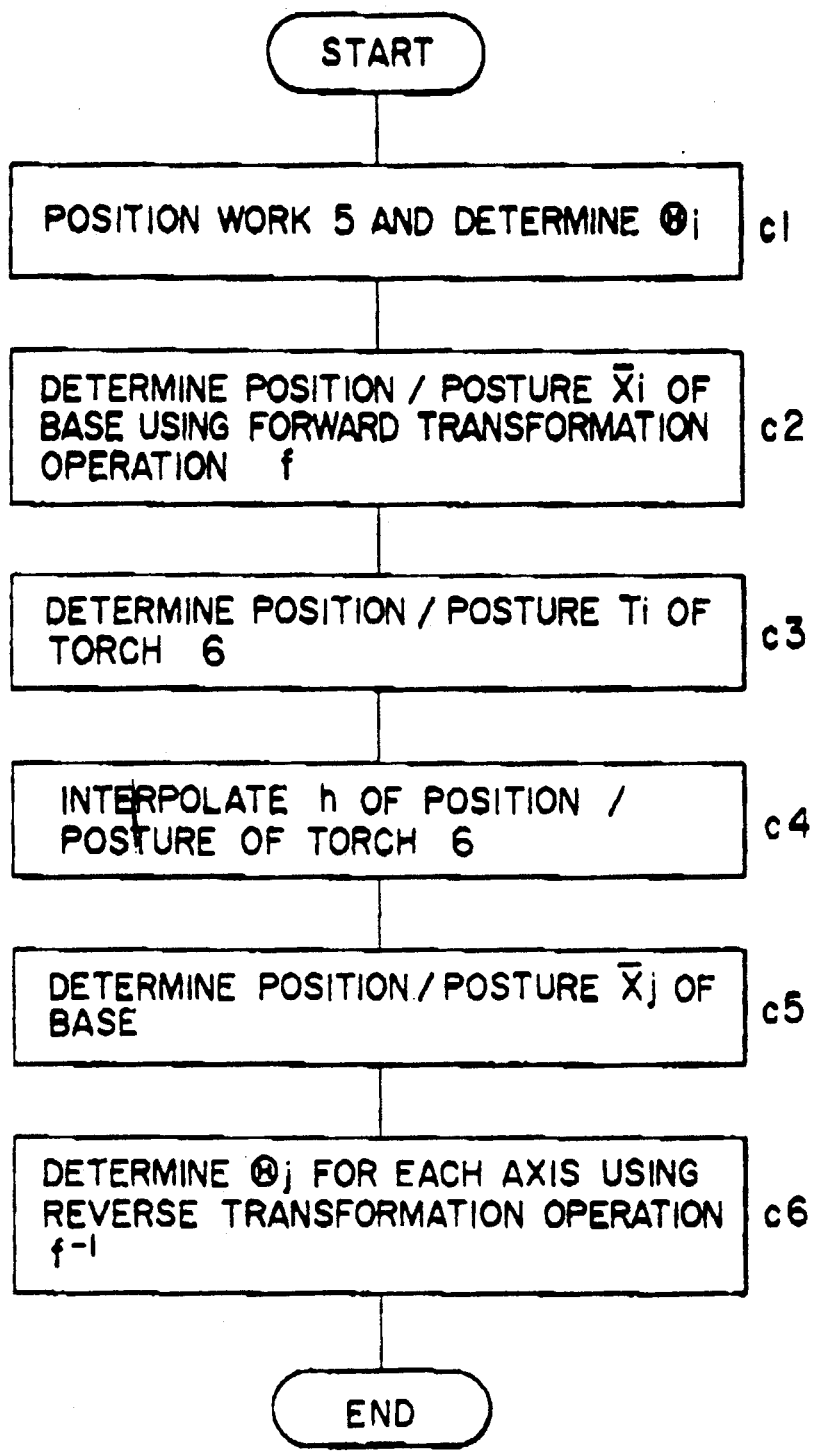
FIG. 7 is a flow chart for describing the operation of one embodiment of the present invention.

Accordingly, with the present invention, the forward transformation operation f and the reverse transformation operation $f^{-1}$ are used for the control circuit 13 to perform the operation shown in FIG. 7. In this manner, the forward transformation operation f and that reverse transformation operation $f^{-1}$ described beforehand with respect to FIG. 3 and FIG. 5 are used to determine the value $\Theta j$ for each axis in the following manner and with respect to the previously described in FIG. 6.

First, in step c1, the predetermined position of the work 5 is positioned so as to come to the position of the distal end 6a of the arc welding torch 6 and determine the values $\Theta i$ for each of the axes of the robot at this time.

Then, in step c2, the forward transformation operation f is used to determine the relationship $\overline{X}i$ of the position/posture of the robot base 2 with respect to the coordinate system of the hand 4 of the robot for the values $\Theta i$ for each axis.

$$\overline{X}i = \{f(\Theta i)\}^{-1} \tag{17}$$

In step c3, the relationship P for the position/posture of the distal end 6a of the arc welding torch 6 with respect to the coordinate system of the robot base 2 and the position/posture $\overline{X}i$ of the robot base 2 determined in the previous step c2 are used as the basis to determine the position/posture Ti of the distal end 6a of the arc welding torch 6 with respect to the coordinate system of the robot hand 4 for each of the positions/postures that have been determined as described above.

$$Ti = \overline{X}i \cdot p \tag{18}$$

In step c4, the positions/postures Tj between two points T1 and T2 of the positions/postures Ti of the distal end 6a of the arc welding torch 6 and which were determined in step c3, are then determined by the function h for linear or arc compensation.

$$Ti = h(T1, T2) \tag{19}$$

In step c5, the relationship P between the positions/postures of the distal end 6a of the arc welding torch 6 with respect to the coordinate system of the robot base 2 are always constant and so the reverse matrix $P^{-1}$ is also constant. In this step c5, this relationship P and the position/posture Tj determined in step c4 are used as the basis to determine the position/posture $\overline{X}j$ for the robot base with respect to the hand of the robot 4.

$$\overline{X}j = Tj \cdot p^{-1} \tag{20}$$

Finally, in step c6, the reverse transformation operation $f^{-1}$ is used to determine the values $\Theta j$ for each axis of the robot in order to express the relationship $\overline{X}j$ of the positions/postures of the robot base 2 with respect to the coordinate system of the hand 4 of the robot.

$$\Theta j = f^{-1}(\overline{X}j^{-1}) \tag{2}$$

Each of the values $\Theta j$ determined in this step c6 are used as command values for the drive means B1 through B6 to drive each of the axes 7 through 12.

Here, the relationship P of the distal end 6a of the arc welding torch 6 with respect to the robot base becomes as follows when the robot base 2 is provided on the ground and the arc welding torch 6 is fixed in the downwards direction $$P = \begin{bmatrix} -1 & 0 & 0 & x \\ 0 & 1 & 0 & y \\ 0 & 0 & -1 & z \\ 0 & 0 & 0 & 1 \end{bmatrix} \tag{22}$$

or $$P = \begin{bmatrix} 1 & 0 & 0 & x \\ 0 & -1 & 0 & y \\ 0 & 0 & -1 & z \\ 0 & 0 & 0 & 1 \end{bmatrix} \tag{23}$$

Where $(x, y, z)^T$ is the position of the distal end of the arc welding torch with respect to the robot base.

Thus, when compared to the conventional method described with respect to FIG. 3 and FIG. 5, the present invention involves one calculation of the reverse matrix using equation 17 in order to extract each point so as to calculate the two points T1 and T2 in order to perform linear interpolation, and furthermore requires one calculation of the reverse matrix using equation 21 in order to extract the values $\Theta j$ for each of the axes of the robot for each of the points of interpolation. However, the matrix used in robot control is a matrix known as a homogeneous matrix and so the calculation of the reverse matrix is simple, and the amount of calculation increases only marginally. More specifically, the matrix used in robot control is a $4 \times 4$ homogeneous matrix that expresses the rotation of the coordinate system and the parallel movement.

$$M = \begin{bmatrix} a11 & a12 & a13 & a14 \\ a21 & a22 & a23 & a24 \\ a31 & a32 & a33 & a34 \\ 0 & 0 & 0 & 1 \end{bmatrix} \tag{24}$$

Here, $$A = \begin{bmatrix} a11 & a12 & a13 \\ a21 & a22 & a23 \\ a31 & a32 & a33 \end{bmatrix} \tag{25}$$

expresses the rotation of the coordinate system and $$X = \begin{bmatrix} a14 \\ a24 \\ a34 \end{bmatrix} \tag{26}$$

expresses the amount of parallel movement of the coordinate origin. Accordingly, the vectors (all a21 a31)$^T$, (a12 a22 a32)$^T$, (a13 a23 a33)$^T$ are perpendicular, and the norm is 1.

Because of this nature, the reverse matrix $M^{-1}$ of the matrix M is easily determined as follows.

$$M^{-1} = \begin{bmatrix} a11 a21 a31 & (-a11 \cdot a14 - a21 \cdot a24 - a31 \cdot a34) \\ a12 a22 a32 & (-a12 \cdot a14 - a22 \cdot a24 - a32 \cdot a34) \\ a13 a23 a33 & (-a13 \cdot a14 - a23 \cdot a24 - a33 \cdot a34) \\ 0 \quad 0 \quad 0 & 1 \end{bmatrix} \tag{27}$$

Moreover, the previously described forward transformation operation f to convert the values $\Theta i$ for each of the axes of the robot into the robot hand positions $X = (aij)$ is as follows.

$$a11 = C1(C4C6 - S4C5S6) - S1(C3S5S6 + S3S4C6 + S3C4C5C6) \quad (28)$$

$$a12 = -C1S4S5 + S1(C3C5 - S3C4S5) \quad (29)$$

$$a13 = -C1(C4S6 + S4C5C6) - S1(C3S5C6 - S3S4S6 + S3C4C5C6) \quad (30)$$

$$a14 = l7\{-C1S4S5 + S1(C3C5 - S3C4S5)\} + S1(l6C3 - l5S3 - l4S2 + l2) \quad (31)$$

$$a21 = -S1(C4C6 - S4C5S6) - C1(C3S5S6 + S3S4C6 + S3C4C5S6) \quad (32)$$

$$a22 = S1S4S5 + C1(C3C5 - S3C4S5) \quad (33)$$

$$a23 = S1(C4S6 + S4C5C6) - C1(C3S5C6 - S3S4S6 + S3C4C5C6) \quad (34)$$

$$a24 = l7\{S1S4S5 + C1(C3C5 - S3C4S5)\} + C1(l6C3 - l5S3 - l4S2 + l2) \quad (35)$$

$$a31 = -S3S5S6 + C3S4C6 + C3C4C5S6 \quad (36)$$

$$a32 = S3C5 + C3C4S5 \quad (37)$$

$$a33 = -S3S5C6 - C3S4S6 + C3C4C5C6 \quad (38)$$

$$a34 = l7(S3C5 + C3C4S5) + l6S3 + l5C3 + l4C2 + l3 + l1 \quad (39)$$

$$a41 = 0 \quad (40)$$

$$a42 = 0 \quad (41)$$

$$a43 = 0 \quad (42)$$

$$a44 = 1 \quad (43)$$

Here, $$Ci = \cos\theta i \quad (44)$$

$$Si = \sin\theta i \quad (45)$$

Here, l1 through l7 are constants expressing lengths of arms.

A robot control method where the arc welding torch is fixed and the robot holds a work and performs handling arc welding while moving the torch in a line through the coordinate system of the work, resembles a conventional control method but the framework of thinking is such that the reference is changed from the conventional base to the hand of the robot, and transformed to the position P of the arc welding torch with respect to the robot base and the position T of the arc welding torch with respect to the robot hand. Accordingly, the development of the program for the realization of this control method can use much of conventional control programs. With the present invention, the arc welding torch 6 is fixed and so there is no necessity to move lead lines, and their fixing also becomes simple.

Moreover, the description above was given in terms of linear interpolation but arc interpolation can also be used. In addition, although the description was given in terms of having welding as the object of work, this method can also be applied to sealing and other types of work.

What is claimed is:

1. An industrial robot control method, comprising the steps of:

determining positional values $\theta_i$ corresponding to positions/postures of a plurality of axes of an industrial robot when a work mounted to an end portion of a hand of the robot is located at a position adjacent to an end portion of a tool separated from the robot;

determining positions/postures $\overline{X}_i$ in a reverse matrix representation, for the values $\theta_i$, of a robot base of the robot with respect to a coordinate system of the end portion of the hand by means of a forward transformation operation by which positions/postures of the end portion of the hand with respect to the robot base are determined using the values $\theta_i$;

determining positions/postures $T_i$ in a matrix representation, for the positions/postures of the axes, of the end portion of the tool with respect to the coordinate system of the end portion of the hand, on the basis of the positions/postures $\overline{X}_i$ and predetermined positions/postures P in a matrix representation of the end portion of the tool with respect to the coordinate system of the robot base;

determining intermediate positions/postures $T_j$ each between two of the positions/postures $T_i$, using an interpolation function;

determining positions/postures $\overline{X}_j$ in a reverse matrix representation of the robot base with respect to the coordinate system of the end portion of the hand, on the basis of the positions/postures P and the positions/postures $T_j$;

determining positional values $\theta_j$ corresponding to positions/postures of the axes and to the positions/postures $\overline{X}_j$, using a reverse transformation operation of the forward transformation operation; and driving the robot using the values $\theta_j$.

2. An apparatus for controlling an industrial robot having a plurality of axes, a robot base and a hand for holding a work at an end portion thereof, the apparatus comprising:

detection means for detecting positions/postures of the axes when the work is located at a position adjacent to an end portion of a tool separated from the robot and outputting positional values $\theta_i$ corresponding to the positions/postures of the axes;

drive means for driving the axes; and control means for controlling the drive means in accordance with the values $\theta_i$, the control means determining positions/postures $\overline{X}_i$ in a reverse matrix representation, for the values $\theta_i$, of the robot base with respect to a coordinate system of the end portion of the hand by means of a forward transformation operation by which positions/postures of the end portion of the hand with respect to the robot base are determined using the values $\theta_i$;

determining positions/postures $T_i$ in a matrix representation, for the positions/postures of the axes, of the end portion of the tool with respect to the coordinate system of the end portion of the hand, on the basis of the positions/postures $\overline{X}_i$ and predetermined positions/postures P in a matrix representation of the end portion of the tool with respect to the coordinate system of the robot base;

determining intermediate positions/postures $T_j$ each between two of the positions/postures $T_i$, using an interpolation function;

determining positions/postures $\overline{X}_j$ in a reverse matrix representation of the robot base with respect to the coordinate system of the end portion of the hand, on the basis of the positions/postures P and the positions/postures $T_j$; and determining positional values $\theta_j$ corresponding to positions/postures of the axes and to the positions/postures $\overline{X}_j$, using a reverse transformation operation of the forward transformation operation;

thus the control means is controlling the driving means using the values $\theta_j$.

* * * * *